United States Patent [19]

Herman et al.

[11] Patent Number: 4,670,740

[45] Date of Patent: Jun. 2, 1987

[54] PORTABLE, BATTERYLESS, FREQUENCY DIVIDER CONSISTING OF INDUCTOR AND DIODE

[75] Inventors: Fred W. Herman, Tampa; Lincoln H. Charlot, Jr., St. Petersburg, both of Fla.

[73] Assignee: Security Tag Systems, Inc., St. Petersburg, Fla.

[21] Appl. No.: 794,552

[22] Filed: Nov. 4, 1985

[51] Int. Cl.$^4$ ........................ H02M 5/20; G08B 13/18

[52] U.S. Cl. .................................... 340/572; 343/895; 363/159

[58] Field of Search ................ 340/572; 343/895, 894; 363/159, 158, 170, 157; 307/271

[56] References Cited

U.S. PATENT DOCUMENTS

| | | | |
|---|---|---|---|
| 4,431,965 | 2/1984 | Aslan | 343/895 |
| 4,481,428 | 11/1984 | Charlot, Jr. | 363/157 |
| 4,609,911 | 9/1986 | Nourse et al. | 340/572 |

FOREIGN PATENT DOCUMENTS 2017454 9/1979 United Kingdom .

*Primary Examiner*—Glen R. Swann, III
*Attorney, Agent, or Firm*—Edward W. Callan

[57] ABSTRACT

A batteryless, portable, frequency divider consists of a single resonant circuit consisting of an inductor and a diode. The resonant circuit detects electromagnetic radiation at a first predetermined frequency and responds to said detection by transmitting electromagnetic radiation at a second frequency that is one-half of the first frequency. The circuit is resonant at the second frequency when the voltage across the diode is zero. The frequency divider is utilized in a presence detection system that uses a tag containing the frequency divider. The system transmits electromagnetic radiation at the first frequency into a surveillance zone, and detects the second frequency to detect the presence of the tag in the surveillance zone.

3 Claims, 6 Drawing Figures

PORTABLE, BATTERYLESS, FREQUENCY DIVIDER CONSISTING OF INDUCTOR AND DIODE

BACKGROUND OF THE INVENTION

The present invention generally pertains to frequency dividers and is particularly directed to an improved frequency divider for use as an electronic tag in a presence detection system.

A presence detection system utilizing a frequency divider as an electronic tag is described in United Kingdom Patent Application No. 2,017,454. Such system includes a transmitter for transmitting a scanning signal at a first frequency in a surveillance zone; an electronic tag including an active frequency divider for detecting electromagnetic radiation at the first frequency and for transmitting a presence signal in response thereto at a second frequency that is a submultiple of the first frequency; and a receiver for detecting electromagnetic radiation at the second frequency to thereby detect the presence of the electronic tag in the surveillance zone. Such electronic tags are attached to articles of which detection is desired for enabling detection of the presence of such articles in the surveillance zone. Such presence detection systems are useful for detecting shoplifting, as well for other applications.

A few examples of such other applications include detecting the presence of a person or vehicle carrying an electronic tag in a surveillance zone; detecting the presence of articles bearing electronic tags within a surveillance zone along an assembly line; detecting the presence of keys attached to electronic tags in a surveillance zone at the exit of an area from which such keys are not to be removed; and detecting the removal of sentitive and valuable materials, such as a computer tape containing a data base or computer program, from a secure area by detecting the presence of such materials having electronic tags attached thereto in a surveillance zone at the exit of the secured area.

The electronic tag is encased in a small card-shaped container that can be attached to an article in such a manner that it cannot be removed from the article without a special tool. When used in a shoplifting detection system, a sales clerk uses a special tool to remove the electronic tag from the merchandise that is paid for; and the surveillance zone is located near the doorway for enabling detection of articles from which the electronic tags have not been removed.

The electronic tag described in the aforementioned patent application includes a complex frequency divider that must be powered by an expensive long-life miniature battery.

A frequency divider that may be operated without a battery or any other external power supply that is suited for use as an electronic tag in a presence detection system is described in U.S. Pat. No. 4,481,428. Such frequency divider includes a first circuit that is resonant at a first frequency for receiving electromagnetic radiation at the first frequency; a second circuit that is resonant at a second frequency that is a sub-harmonic of the first frequency for transmitting electromagnetic radiation at the second frequency; and a semiconductor switching device having gain coupling the first and second circuits for causing the second circuit to transmit electromagnetic radiation at the second frequency solely in response to unrectified energy at the first frequency provided in the first circuit upon receipt of electromagnetic radiation at the first frequency.

SUMMARY OF THE INVENTION

The present invention provides an improved portable, batteryless, frequency divider that is useful in a presence detection system. The improved frequency divider of the present invention is less complex and less expensive than the frequency divider described in the aforementioned U.S. Pat. No. 4,481,428.

The batteryless, portable frequency divider, of the present invention consists of a single resonant circuit consisting of an inductor and a diode connected in parallel with the inductor to define a resonant circuit that detects electromagnetic radiation at a first predetermined frequency and responds to said detection by transmitting electromagnetic radiation at a second frequency that is one-half of the first frequency. The circuit is resonant at the second frequency when the voltage across the diode is zero.

The reason why the resonant circuit transmits electromagnetic radiation at the second frequency is believed to be because of the nonlinear capacitance characteristic that is inherent in a diode.

The frequency divider of the present invention is utilized in a presence detection system that uses a tag containing the frequency divider. The system transmits electromagnetic radiation at the first frequency into a surveillance zone, and detects the second frequency to detect the presence of the tag in the surveillance zone.

Additional features of the present invention are described with relation to the description of the preferred embodiments.

DESCRIPTION OF THE PREFERRED EMBODIMENTS

Figure 1:
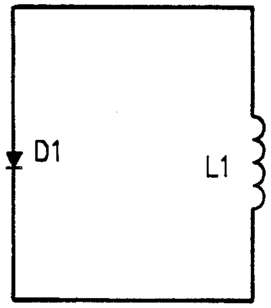
FIG. 1 illustrates a preferred embodiment of the frequency divider of the present invention.
Figure 2:
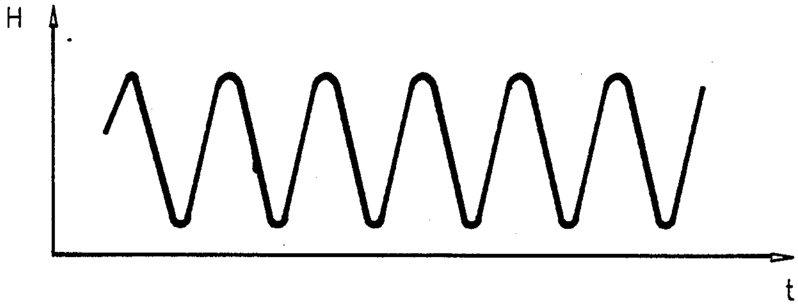
FIG. 2 shows a waveform of electromagnetic radiation at the first predetermined frequency detected by the resonant circuit in the frequency divider of FIG. 1.
Figure 3:
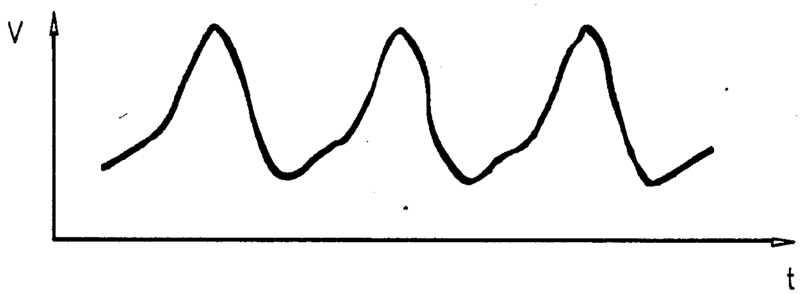
FIG. 3 shows a waveform of the voltage induced in the inductor of the frequency divider of FIG. 1 by electromagnetic radiation having the waveform shown in FIG. 2.
Figure 4:
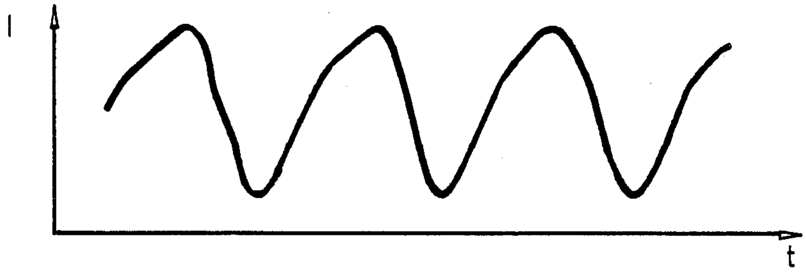
FIG. 4 shows a waveform of the current induced in the resonant circuit of FIG. 1 by electromagnetic radiation having the waveform shown in FIG. 2.

Referring to FIG. 1, one preferred embodiment of the frequency divider of the present invention consists of an inductor L1 connected in parallel with a diode D1 to define a parallel resonant circuit. The values of these components are chosen to define a parallel resonant circuit that detects electromagnetic radiation at a first predetermined frequency and responds to said detection by transmitting electromagnetic radiation at a second frequency that is one-half of the first frequency.

The diode is a Model MV1405 diode manufactured by Motorola. Other diodes may be used provided that the diode which is chosen has a relatively high rate of change of capacitance with respect to voltage characteristic, dC/dV, at the zero-voltage axis crossing.

The inductor is rated at 5.39 millihenries and has 330 turns of #32 AWG wire having a resistance of 59 ohms.

Figure 5:
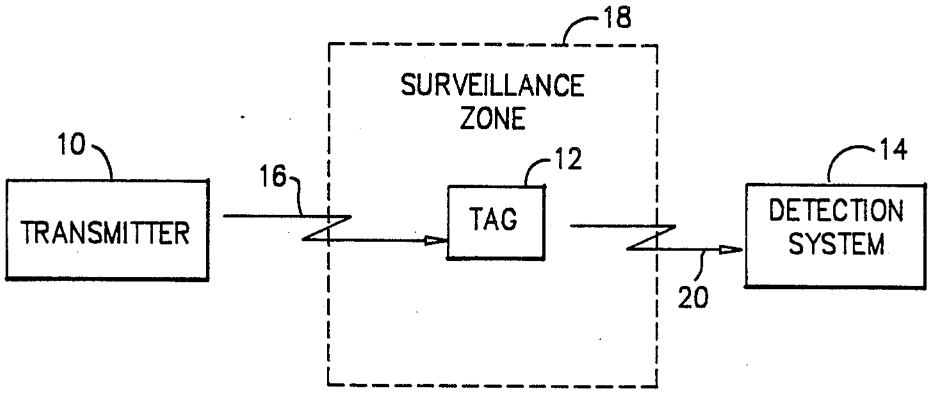
FIG. 5 is a block diagram of a presence detection system including a frequency divider according to the present invention.

The frequency divider of FIG. 1 is utilized in a preferred embodiment of a presence detection system according to the present invention, as shown in FIG. 5. Such system includes a transmitter 10, a tag 12, and a detection system 14.

The transmitter 10 transmits an electromagnetic radiation signal 16 of a first predetermined frequency into a surveillance zone 18.

The tag 12 is attached to an article (not shown) to be detected within the surveillance zone 18. The tag includes a batteryless, portable, frequency divider constructed as described above with reference to FIG. 1.

The detection system 14 detects electromagnetic radiation 20 at the second frequency in the surveillance zone 18, and thereby detects the presence of the tag 12 in the surveillance zone 18. The second frequency is one-half of the first frequency.

Measurements have been made of capacitance as a function of voltage for several diodes. This data was fitted to the following curves for reverse and forward capacitance to this data.

$$C=K_1e^{K_2V_c}$$

$V_c>0.41$ volts $$C=C_o+C_1(V_c+10)^b$$

$V_c>0.41$ volts where

- $C$=diode capacitance
- $V_c$=voltage across diode
- $K_1=3.86\times 10$ (typical value)
- $K_2=40.098$ (typical value)
- $C_o=21$ pf (typical value)
- $C_1=0.5268$ pf (typical value)
- $b=2.92$ (typical value)

The diode current vs. voltage relationship is given by:

$$i_D=I_se^{K_3V_D}-I_s$$

where

Figure 6:
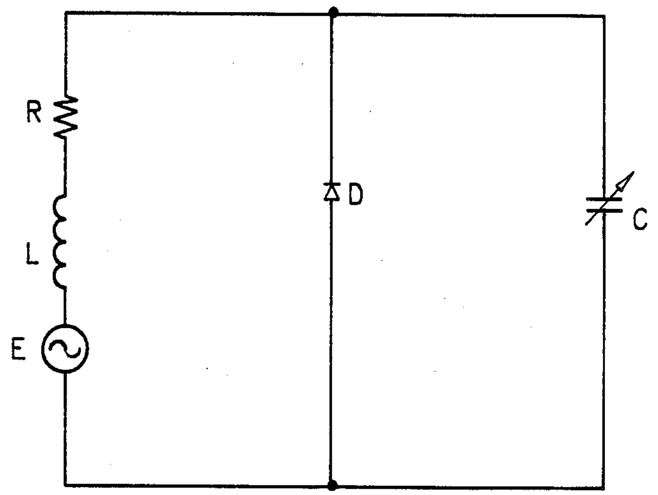
FIG. 6 is an equivalent circuit of the frequency divider of FIG. 1.

- $I_s=8.7\times 10^{-9}$ (typical value) $K_3=29.749$ (typical value)
- $i_d$=Current thru diode
- $V_d$=voltage across diode The equivalent circuit of the frequency divider of FIG. 1 is shown in FIG. 6.

The circuit analysis for the equivalent circuit of FIG. 6 results in two simultaneous nonlinear differential equations.

$$\frac{dV_c}{dt}=\frac{i_L-I_s(e^{K_2V_c}-1)}{K_1e^{K_2V_c}(K_2V_c+1)} \text{ if } V_c>0.41 \text{ volts}$$

$$\frac{dV_c}{dt}=$$

-continued $$\frac{i_L-I_s(e^{K_3V_c}-1)}{C_o+C_1V_cb(V_c+10)^{b-1}+C_1(V_c+10)^b} \text{ if } V_c<0.41 \text{ volts}$$

$$\frac{di_L}{dt}=\frac{A\sin wt-i_LR-V_c}{L}$$

Those two simultaneous nonlinear differential equations may be solved using a numerical method called Runge-Kutta Method. The recursive relations are given by:

$$i_{n+1}=i_n+\frac{1}{6}[M_1+2M_2+2M_3+M_4]$$

$$V_{n+1}=V_n+\frac{1}{6}[N_1+2N_2+2N_3+N_4]$$

We claim:

1. A batteryless, portable, frequency divider, consisting of
   - a single resonant circuit, consisting of
   - an inductor; and
   - a diode connected in parallel with the inductor to define a resonant circuit that detects electromagnetic radiation at a first predetermined frequency and responds to said detection by transmitting electromagnetic radiation at a second frequency that is one-half of the first frequency, wherein the circuit is resonant at the second frequency when the voltage across the diode is zero.

2. A tag for use in a presence detection system, comprising a batteryless, portable, frequency divider, consisting of
   - a single resonant circuit, consisting of
   - an inductor; and
   - a diode connected in parallel with the inductor to define a resonant circuit that detects electromagnetic radiation at a first predetermined frequency and responds to said detection by transmitting electromagnetic radiation at a second frequency that is one-half of the first frequency, wherein the circuit is resonant at the second frequency when the voltage across the diode is zero.

3. A presence detection system, comprising
   - means for transmitting an electromagnetic radiation signal of a first predetermined frequency into a surveillance zone;
   - a tag for attachment to an article to be detected within the surveillance zone, comprising a batteryless, portable, frequency divider consisting of a single resonant circuit, consisting of an inductor; and a diode connected in parallel with the inductor to define a resonant circuit that detects electromagnetic radiation at the first predetermined frequency and responds to said detection by transmitting electromagnetic radiation at a second frequency that is one-half of the first frequency, wherein the circuit is resonant at the second frequency when the voltage across the diode is zero; and
   - means for detecting electromagnetic radiation at the second frequency in the surveillance zone.

* * * * *